US012649195B2

(12) United States Patent
Hatada et al.

(10) Patent No.: US 12,649,195 B2
(45) Date of Patent: Jun. 9, 2026

(54) CONTROL DEVICE FOR PERFORMING BRAZING, BRAZING SYSTEM, AND BRAZING METHOD

(71) Applicant: Fanuc Corporation, Minamitsuru-gun (JP)

(72) Inventors: Masanobu Hatada, Minamitsuru-gun (JP); Hiromitsu Takahashi, Minamitsuru-gun (JP)

(73) Assignee: FANUC CORPORATION, Yamanashi (JP)

( * ) Notice: Subject to any disclaimer, the term of this patent is extended or adjusted under 35 U.S.C. 154(b) by 903 days.

(21) Appl. No.: 17/915,671

(22) PCT Filed: Mar. 29, 2021

(86) PCT No.: PCT/JP2021/013403
§ 371 (c)(1),
(2) Date: Sep. 29, 2022

(87) PCT Pub. No.: WO2021/200872
PCT Pub. Date: Oct. 7, 2021

(65) Prior Publication Data
US 2023/0117585 A1     Apr. 20, 2023

(30) Foreign Application Priority Data
Apr. 1, 2020     (JP) ................................. 2020-066242

(51) Int. Cl.
*B23K 3/04*          (2006.01)
*B23K 1/005*        (2006.01)
(Continued)

(52) U.S. Cl.
CPC .............. *B23K 3/04* (2013.01); *B23K 1/0056* (2013.01); *B23K 37/047* (2013.01); *B23Q 15/013* (2013.01); *B23Q 15/14* (2013.01)

(58) Field of Classification Search
CPC ..... B23K 3/063; B23K 1/0056; B23Q 15/013
See application file for complete search history.

(56) References Cited

U.S. PATENT DOCUMENTS 8,680,434 B2      3/2014  Stöger et al.
10,052,759 B2 *   8/2018  Tao ...................... G05B 13/021
(Continued)

FOREIGN PATENT DOCUMENTS

CN          101218060 A       7/2008
DE      102016003464 A1 *   9/2016   ........... B23K 26/342
(Continued)

OTHER PUBLICATIONS

JP200239718 translation (Year: 2002).*
(Continued)

*Primary Examiner* — Woody A Lee, Jr.
(74) *Attorney, Agent, or Firm* — BUCHANAN INGERSOLL & ROONEY PC

(57) ABSTRACT

The control device includes a brazing controller configured to control a brazing material moving mechanism so as to retract a tip of a brazing material from a heating position to interrupt the brazing, during execution of the brazing, and a movement controller configured to, when the brazing is interrupted, control a movement machine so as to retract a heating device or a base material in a direction opposite to a movement direction during the execution of the brazing, and subsequently advance the heating device or the base material in the movement direction again. The brazing controller resumes the brazing by controlling the brazing material moving mechanism so as to cause the tip of the brazing material to reach the heating position at the same time when the heating device or the base material advanced by the movement controller reaches an interruption position at which the brazing is interrupted.

11 Claims, 14 Drawing Sheets

(51) Int. Cl.
*B23K 37/047* (2006.01)
*B23Q 15/013* (2006.01)
*B23Q 15/14* (2006.01)

(56) References Cited

U.S. PATENT DOCUMENTS

| | | | | |
|---|---|---|---|---|
| 2012/0298639 A1 * | 11/2012 | Wang | ..................... | B23K 26/20 |
| | | | | 219/121.64 |
| 2015/0273604 A1 | 10/2015 | Anderson et al. | | |
| 2017/0165778 A1 * | 6/2017 | Hsu | ..................... | B23K 9/1093 |
| 2019/0061053 A1 | 2/2019 | Yang et al. | | |

FOREIGN PATENT DOCUMENTS

| | | | | | |
|---|---|---|---|---|---|
| DE | 102016003465 A1 * | 9/2016 | ........... | B23K 1/0056 |
| EP | 1514634 A1 * | 3/2005 | ............. | B23K 26/32 |
| JP | 05154676 A | 6/1993 | | |
| JP | 0647547 A | 2/1994 | | |
| JP | 06091370 A | 4/1994 | | |
| JP | 0857646 A | 3/1996 | | |
| JP | 2002239718 A * | 8/2002 | | |
| JP | 2007268549 A | 10/2007 | | |
| JP | 2009190062 A | 8/2009 | | |
| JP | 2011218423 A | 11/2011 | | |
| JP | 2014014828 A | 1/2014 | | |
| JP | 2014200829 A | 10/2014 | | |
| JP | 2018069315 A | 5/2018 | | |

OTHER PUBLICATIONS

International Search Report and Written Opinion for International Application No. PCT/JP2021/013403, dated Apr. 27, 2021, 6 pages.

* cited by examiner

CONTROL DEVICE FOR PERFORMING BRAZING, BRAZING SYSTEM, AND BRAZING METHOD

CROSS REFERENCE TO RELATED APPLICATIONS

This is the U.S. National Phase application of PCT/JP2021/013403, filed Mar. 29, 2021, which claims priority to Japanese Patent Application No. 2020-066242, filed Apr. 1, 2020, the disclosures of these applications being incorporated herein by reference in their entireties.

FIELD OF THE INVENTION

The present invention relates to a control device for performing brazing on a base material, a brazing system, and a brazing method.

BACKGROUND OF THE INVENTION

In the related art, there is known a brazing system for performing brazing on a base material by using a movement machine such as a robot (e.g., Patent Document 1).

PATENT LITERATURE

Patent Document 1: JP 2018-69315 A

SUMMARY OF THE INVENTION

In the brazing system, brazing may be interrupted for some reason. In such a case, there is a need for a technique that prevents a shape defect such as unevenness in a formed bead.

An aspect of the present disclosure, is a control device configured to perform brazing on a base material by controlling a heating device for a brazing material, a movement machine configured to move the heating device and the base material relative to each other, and a brazing material moving mechanism configured to advance and retract a tip of the brazing material with respect to a heating position of the heating device, the control device including a brazing controller configured to control the brazing material moving mechanism so as to retract the tip of the brazing material from the heating position to interrupt the brazing, during execution of the brazing; and a movement controller configured to, when the brazing is interrupted, control the movement machine so as to retract the heating device or the base material in a direction opposite to a movement direction during the execution of the brazing, and subsequently advance the heating device or the base material in the movement direction again, wherein the brazing controller resumes the brazing by controlling the brazing material moving mechanism so as to cause the tip of the brazing material to reach the heating position at the same time when the heating device or the base material advanced by the movement controller reaches an interruption position at which the brazing is interrupted.

Another aspect of the present disclosure, is a method of performing brazing on a base material by controlling a heating device for a brazing material, a movement machine configured to move the heating device and the base material relative to each other, and a brazing material moving mechanism configured to advance and retract a tip of the brazing material with respect to a heating position of the heating device, the method including controlling the brazing material moving mechanism so as to retract the tip of the brazing material from the heating position to interrupt the brazing, during execution of the brazing; when the brazing is interrupted, controlling the movement machine so as to retract the heating device or the base material in a direction opposite to a movement direction during the execution of the brazing, and subsequently advance the heating device or the base material in the movement direction again; and resuming the brazing by controlling the brazing material moving mechanism so as to cause the tip of the brazing material to reach the heating position at the same time when the advanced heating device or the base material reaches an interruption position at which the brazing is interrupted.

According to the present disclosure, when the heating position of a heating device reaches the end of the brazing material, which has stopped being supplied due to the interruption in brazing, the brazing can be resumed by feeding the tip of the brazing material to the heating position. In a bead formed when the brazing material applied as described above solidifies, a shape defect such as unevenness at the location where brazing was interrupted can be prevented, and thus a bead that smoothly extends along a work path can be formed.

BRIEF DESCRIPTION OF DRAWINGS

FIG. 4 is a diagram illustrating brazing performed on a base material.

DETAILED DESCRIPTION OF EMBODIMENTS OF THE INVENTION

Figure 1:
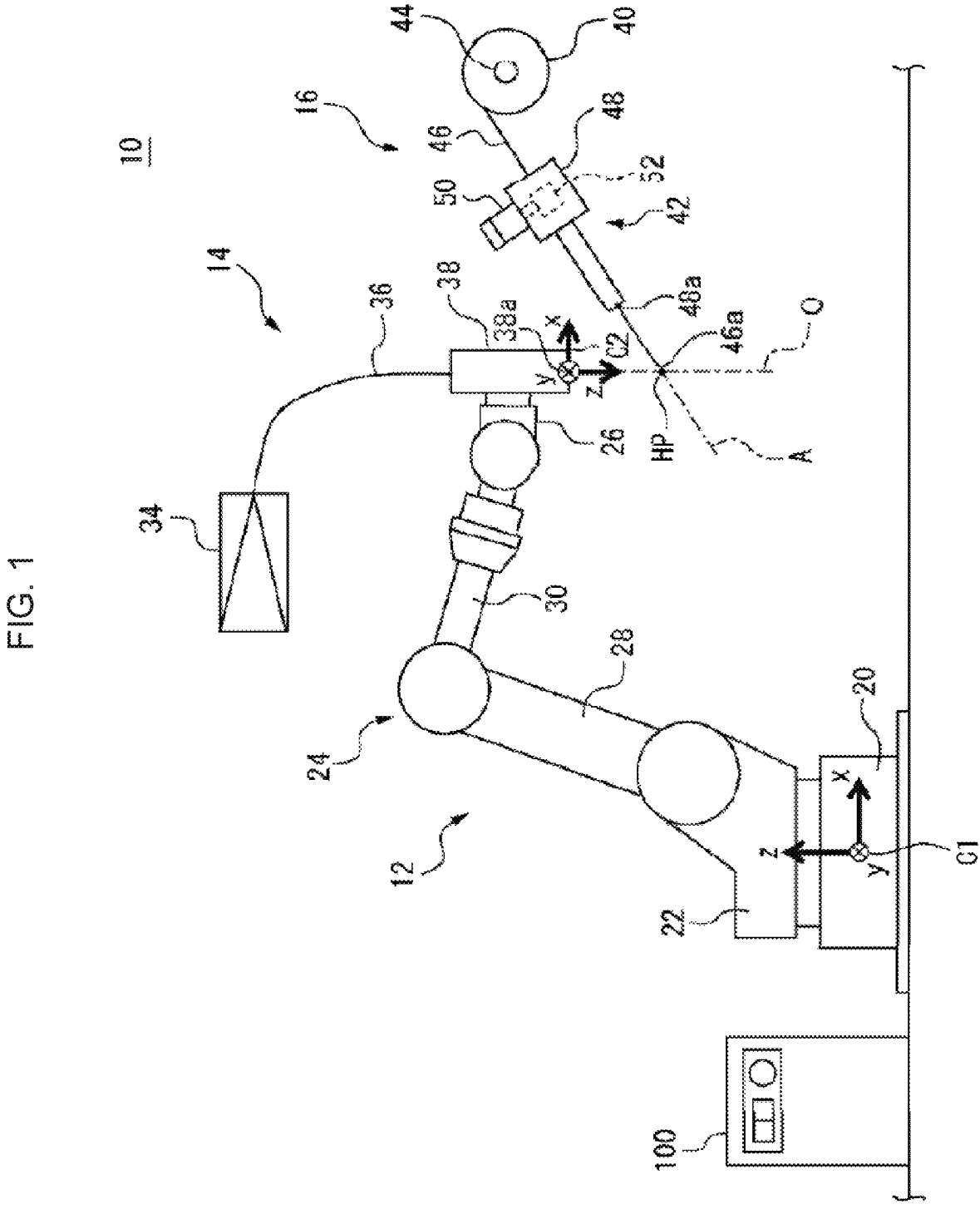
FIG. 1 is a diagram of a brazing system according to an embodiment.

Hereinafter, embodiments of the present disclosure will be described in detail with reference to the drawings. Note that in various embodiments described below, the same elements are denoted by the same reference signs, and redundant description will be omitted. First, a brazing system 10 according to an embodiment will be described with reference to FIG. 1 and FIG. 2. The brazing system 10 performs brazing on base materials W1 and W2 to be described later.

The brazing system 10 includes a movement machine 12, a laser device 14, a brazing material feeding device 16, and a control device 100. In the present embodiment, the movement machine 12 is a vertical articulated robot, and includes a base 20, a turning body 22, a robot arm 24, and a wrist 26. The base 20 is anchored on the floor of a work cell.

The turning body 22 is provided on the base 20 so as to be turnable about a vertical axis. The robot arm 24 includes a lower arm 28 provided on the turning body 22 so as to be rotatable about a horizontal axis, and an upper arm 30 rotatably provided at a tip portion of the lower arm 28. The wrist 26 is rotatably provided at a tip portion of the upper arm 30.

Figure 2:
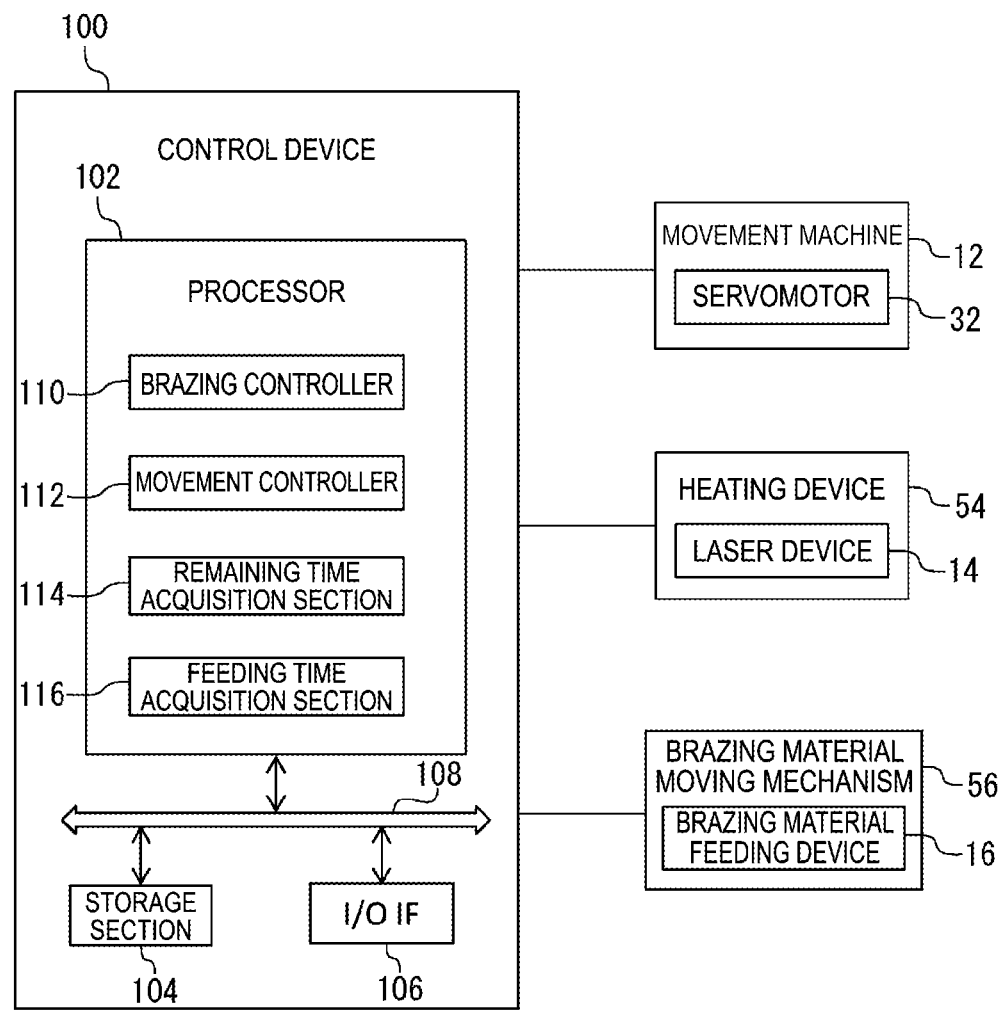
FIG. 2 is a block diagram of the brazing system illustrated in FIG. 1.

Each constituent element of the movement machine 12 (i.e., the base 20, the turning body 22, the robot arm 24, and the wrist 26) includes a built-in servo motor 32 (FIG. 2). The servomotor 32 drives each movable element (i.e., the turning body 22, the robot arm 24, and the wrist 26) of the movement machine 12 in response to a command from the control device 100.

The laser device 14 includes a laser oscillator 34, a light guide path 36, and a laser machining head 38. The laser oscillator 34 is, for example, a solid laser oscillator (e.g., a YAG laser oscillator or a fiber laser oscillator), and generates a laser beam and emits the laser beam to the light guide path 36 in response to a command from the control device 100. The light guide path 36 is, for example, an optical fiber, and guides the laser beam from the laser oscillator 34 to the laser machining head 38.

The laser machining head 38 has a hollow center and includes an optical lens (e.g., a collimate lens or a focus lens) therein. The laser machining head 38 concentrates the laser beam incident from the light guide path 36 and emits the laser beam from an exit port 38a along an optical axis O to the outside. The laser machining head 38 is removably attached to the wrist 26 and is moved by the movement machine 12.

The brazing material feeding device 16 includes a drum 40 and a feeding head 42. The drum 40 has a cylindrical shape and is rotatably supported about a central shaft 44. A brazing material 46 is stored by being wound around an outer periphery of the drum 40. The feeding head 42 is fixed to the laser machining head 38 (or the wrist 26) via, for example, a fixture (not illustrated) to establish a predetermined positional relationship with the laser machining head 38.

Specifically, the feeding head 42 includes a main body 48, a feeding motor 50, and a pair of rollers 52. The main body 48 has a hollow center and includes a feeding port 48a at a tip thereof. The feeding port 48a opens in a direction of a feeding axis A. The feeding motor 50 is fixed to the main body 48, and rotates the pair of rollers 52 in directions opposite to each other in response to a command from the control device 100.

The pair of rollers 52 are rotatably housed in the main body 48. The brazing material 46 drawn out from the drum 40 is sandwiched between the pair of rollers 52. When the feeding motor 50 rotates the rollers 52 in one direction, the drum 40 is rotated in that direction so that the brazing material 46 is fed to the outside of the main body 48 along the feeding axis A through the feeding port 48a of the main body 48.

On the other hand, when the feeding motor 50 rotates the rollers 52 in the other direction, the drum 40 is rotated in the other direction so that the brazing material 46 is wound around the drum 40 and drawn inside the main body 48 through the feeding port 48a. In this way, the brazing material feeding device 16 advances and retracts a tip 46a of the brazing material 46 along the feeding axis A by feeding out and winding in the brazing material 46.

The control device 100 controls operations of the movement machine 12, the laser device 14, and the brazing material feeding device 16. Specifically, the control device 100 is a computer including a processor 102, a storage section 104, and an I/O interface 106. The processor 102 includes a CPU or a GPU and is communicatively connected to the storage section 104 and the I/O interface 106 via a bus 108. The processor 102 performs arithmetic processing for implementing various functions of the brazing system 10 while communicating with the storage section 104 and the I/O interface 106.

The storage section 104 includes a RAM or a ROM and stores various types of data temporarily or permanently. The I/O interface 106 includes, for example, an Ethernet (registered trademark) port, a USB port, a fiber optic connector, or an HDMI (registered trademark) terminal, and exchanges data with an external device through wireless or wired communication under a command from the processor 102. The servo motor 32, the laser oscillator 34, and the feeding motor 50 described above are communicatively connected to the I/O interface 106 in a wireless or wired manner.

A movement machine coordinate system C1 is set for the movement machine 12. The movement machine coordinate system C1 is a control coordinate system for automatically controlling operation of each of the movable elements of the movement machine 12. In the present embodiment, the movement machine coordinate system C1 is set for the movement machine 12 such that the origin of the movement machine coordinate system C1 is located at the center of the base 20 and the z-axis of the movement machine coordinate system C1 coincides with the turning axis of the turning body 22.

Likewise, a tool coordinate system C2 is set for the laser machining head 38. The tool coordinate system C2 is a control coordinate system that defines the position and orientation of the laser machining head 38 in the movement machine coordinate system C1. In the present embodiment, the tool coordinate system C2 is set for the laser machining head 38 such that the origin of the tool coordinate system C2 is located at the exit port 38a of the laser machining head 38 and the z-axis of the tool coordinate system C2 coincides with the optical axis O.

The processor 102 transmits a command to each servo motor 32 of the movement machine 12, causing the movement machine 12 to move the laser machining head 38 such that the laser machining head 38 is arranged at the position and orientation indicated by the tool coordinate system C2 set for the movement machine coordinate system C1. Thus, the processor 102 can position the laser machining head 38 at any position and in any orientation in the movement machine coordinate system C1. In this way, the movement machine 12 moves the laser machining head 38 of the laser device 14 relative to the base material.

Figure 4:
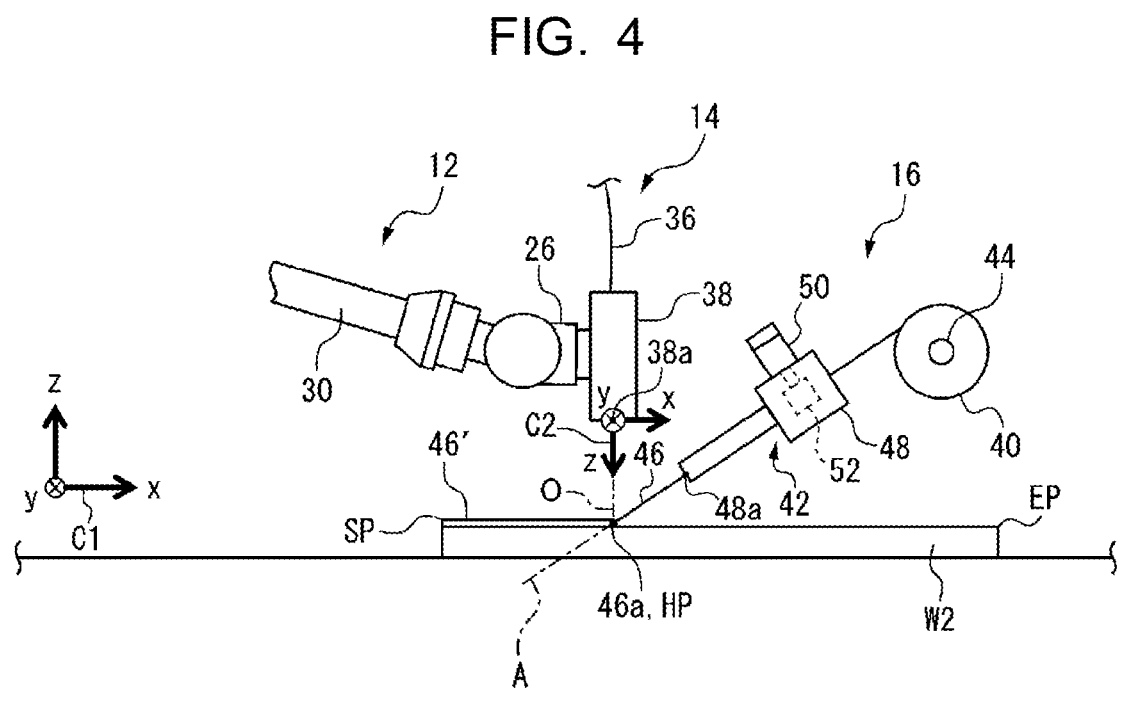
Figure 5:
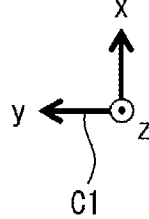
FIG. 5 is a diagram illustrating brazing performed on the base material.

Next, operation of the brazing system 10 will be described with reference to FIG. 3. The flow illustrated in FIG. 3 starts when the processor 102 receives a work start command from an operator, a host controller, or a work program BP. In step S1, the processor 102 starts brazing the base materials W1 and W2. FIGS. 4 and 5 illustrate an example of the base materials W1 and W2.

In the present embodiment, a work path WP (FIG. 5) is set along a joint portion between the two base materials W1 and W2, and the brazing system 10 performs brazing along the work path WP from a start point SP to an end point EP of the work path WP. Note that in the present embodiment, the work path WP is arranged parallel to the x-axis of the movement machine coordinate system C1.

After the start of step S1, the processor 102 activates the laser oscillator 34 and causes the laser oscillator 34 to emit a laser beam from the laser machining head 38 along the optical axis O, and operates the feeding motor 50 of the brazing material feeding device 16 to feed out the brazing material 46 from the feeding port 48a. The laser device 14 uses the laser beam emitted from the laser machining head 38 to heat and melt the tip 46a of the brazing material 46 at a heating position HP.

In the present embodiment, the heating position HP can be defined as a point of intersection between the optical axis O and the feeding axis A (or a position at the vicinity thereof). The laser machining head 38 may focus the laser beam on the heating position HP by using a built-in focus lens. As described above, in the present embodiment, the laser device 14 functions as a heating device 54 (FIG. 2) that heats and melts the brazing material 46.

Next, the processor 102 operates the movement machine 12 to advance the laser machining head 38 (or the origin of the tool coordinate system C2) in an x-axis positive direction of the movement machine coordinate system C1. In this way, the heating position HP is advanced from the start point SP toward the end point EP along the work path WP, and the feeding motor 50 of the brazing material feeding device 16 is operated to feed the brazing material 46 at a predetermined speed VF (i.e., feeding speed). The speed VF (e.g., unit: [mm/sec]) is determined in advance as a required speed value at which the feeding motor 50 advances the tip 46a of the brazing material 46 toward the heating position HP during the execution of brazing.

Accordingly, as illustrated in FIG. 4 and FIG. 5, a bead 46' is formed along the work path WP. The bead 46' is the brazing material 46 that has been applied and solidified. The base materials W1 and W2 are joined to each other along the joint portion by the bead 46'. After step S1 is started, the processor 102 controls the movement machine 12, the laser device 14, and the brazing material feeding device 16 in accordance with the work program BP. In the work program BP, a plurality of target positions $TP_n$ (n=1, 2, 3, . . . ) at which the laser machining head 38 (the origin of the tool coordinate system C2) is to be positioned during the execution of brazing are defined.

In step S2, the processor 102 determines whether an interruption event has occurred for which the brazing started in step S1 should be interrupted. For example, the interruption event includes a case where the processor 102 determines that an operation state parameter (a coolant temperature, a coolant flow rate, a laser output value, an optical axis displacement amount, etc.) of the laser oscillator 34 is abnormal, or a case where an alarm indicating an abnormality in the operation state parameter is issued.

Alternatively, when a no-entry area is set around the movement machine 12 by using a safety fence or a non-contact sensor, the interruption event includes a case where the safety fence or the non-contact sensor detects entry of an object into the no-entry area, or a case where an entry detection alarm is issued. In step S2, the processor 102 monitors the operation state parameter, an entry detection signal, or various types of alarms during the execution of brazing in step S1, and determines whether the interruption event has occurred.

As another example, a plurality of machine systems and the brazing system 10 may be aligned along one manufacturing line and cooperate with each other to perform work on the base material. Such machine systems may include, for example, a workpiece handling system that handles the base material, a welding system that performs welding (spot welding, arc welding, etc.) on the base material, or a brazing system of a similar type to the brazing system 10. In this case, the interruption event includes a case where the operation of a robot of a machine system on an upstream side of the brazing system 10 in the manufacturing line has stopped.

In this situation, a control device of the machine system on the upstream side transmits an interruption command to the control device 100 of the brazing system 10 on a downstream side. In step S2, the processor 102 of the brazing system 10 monitors whether the interruption command has been received, and determines YES when the interruption command has been received. Upon determining YES in step S2, the processor 102 stops the operation of the movement machine 12 to stop the laser machining head 38, and proceeds to step S3. On the other hand, upon determining NO, the processor 102 proceeds to step S11.

In step S3, the processor 102 interrupts a heating operation of the heating device 54 (the laser device 14). In the present embodiment, the heating operation is an operation in which the laser device 14 emits a laser beam from the exit port 38a. As an example, the processor 102 interrupts the heating operation by stopping a laser beam generation operation of the laser oscillator 34 in step S3. As another example, the laser oscillator 34 includes an openable shutter (not illustrated) that can block the generated laser beam, and the processor 102 may interrupt the heating operation by operating the shutter to block the laser beam.

In step S4, the processor 102 causes the tip 46a of the brazing material 46 to retract from the heating position HP. Specifically, the processor 102 operates the feeding motor 50 to wind the brazing material 46 around the drum 40, thereby causing the tip 46a of the brazing material 46 to retract from the heating position HP along the feeding axis A.

At this time, the processor 102 causes the tip 46a of the brazing material 46 to retract from the heating position HP by a predetermined movement amount $\Delta_0$. Here, a rotation speed $R_0$ of the feeding motor 50 that is required to retract the tip 46a along the feeding axis A by the movement amount $\Delta_0$ (i.e., wind the brazing material 46 around the drum 40 by a length of $\Delta_0$) can be determined in advance by an experimental technique or an arithmetic operation. The processor 102 can cause the tip 46a to retract from the heating position HP by the movement amount $\Delta_0$ by controlling the feeding motor 50 so as to rotate the feeding motor 50 by the rotation speed $R_0$ determined in advance.

As described above, in the present embodiment, the brazing material feeding device 16 advances and retracts the tip 46a of the brazing material 46 along the feeding axis A to/from the heating position HP by feeding out and winding in the brazing material 46. Thus, the brazing material feeding device 16 functions as a brazing material moving mechanism 56 (FIG. 2) that advances and retracts the tip 46a of the brazing material 46 to/from the heating position HP. As a result of step S4, the tip 46a of the brazing material 46 separates from the brazing material 46 (or the bead 46' that has started to solidify) applied on the work path WP.

Because of steps S3 and S4 described above, the brazing started in step S1 is interrupted. That is, the processor 102 functions as a brazing controller 110 (FIG. 2) that interrupts brazing by controlling the brazing material moving mechanism 56 (specifically, the feeding motor 50 of the brazing material feeding device 16) so as to retract the tip 46a of the brazing material 46 from the heating position, and by controlling the heating device 54 (specifically, the laser oscillator 34 of the laser device 14) so as to interrupt the heating operation, during the execution of brazing.

Note that the processor 102 may execute step S4 after step S3, or may simultaneously execute steps S3 and S4 at a time point when YES is determined in step S2. Alternatively, the processor 102 may execute step S4 before step S3.

In step S5, the processor 102 stores position data of an interruption position $P_1$ in the movement machine coordinate system C1. In the present embodiment, the interruption position $P_1$ is a position of the laser machining head 38 (or the origin of the tool coordinate system C2) at a time when the processor 102 interrupts the brazing started in step S1.

For example, the processor 102 acquires coordinates of the laser machining head 38 (or the origin of the tool coordinate system C2) in the movement machine coordinate system C1 at a time point when YES is determined in step S2, or at the start or the completion of step S3 or S4 as the position data of the interruption position $P_1$. The coordinates of the laser machining head 38 (the origin of the tool coordinate system C2) in the movement machine coordinate system C1 can be determined by, for example, an arithmetic operation based on feedback FB from a rotation detector (an encoder, a Hall element, etc.) provided in each servo motor 32 of the movement machine 12.

Note that the processor 102 may acquire, as the position data of the interruption position $P_1$, coordinates of the laser machining head 38 (the origin of the tool coordinate system C2) in any of control coordinate systems other than the movement machine coordinate system C1. Other control coordinate systems include, for example, a workpiece coordinate system set for the base materials W1 and W2, or a world coordinate system that defines a three-dimensional space of a work cell. The processor 102 stores the acquired position data of the interruption position $P_1$ in the storage section 104.

In step S6, the processor 102 determines whether a resumption command for resuming the brazing has been received. The resumption command may be issued by an operator or a host controller (or a control device of the machine system on the upstream side described above), for example, when the interruption event described above has been addressed (e.g., an abnormality has been resolved). The processor 102 determines YES and proceeds to step S7 when the resumption command has been received, and determines NO and repeats step S6 when the resumption command has not been received.

In step S7, the processor 102 causes the heating device 54 to retract. Specifically, the processor 102 controls each servo motor 32 of the movement machine 12 so as to retract the laser machining head 38 in a direction (i.e., the x-axis negative direction of the movement machine coordinate system C1) opposite to a movement direction when the brazing is performed (i.e., the x-axis positive direction of the movement machine coordinate system C1) by a retraction distance $d_R$ determined in advance.

In this way, in the present embodiment, the processor 102 functions as a movement controller 112 (FIG. 2) that controls the movement machine 12 so as to retract the heating device 54 (specifically, the laser machining head 38) in the x-axis negative direction of the movement machine coordinate system C1. Upon the completion of step S7, the laser machining head 38 (the origin of the tool coordinate system C2) is located at a retraction position $P_R$, which is a position separated from the interruption position $P_1$ by the retraction distance $d_R$ in the x-axis negative direction of the movement machine coordinate system C1.

In step S8, the processor 102 functions as the brazing controller 110 to resume the heating operation of the heating device 54 (the laser device 14). As an example, the processor 102 resumes the heating operation by causing the laser oscillator 34 to resume the laser beam generation operation. As another example, when the shutter described above is provided, the processor 102 may resume the heating operation by opening the shutter that has blocked the laser beam.

In step S9, the processor 102 functions as the movement controller 112 and starts an operation to advance the heating device 54. Specifically, the processor 102 controls the movement machine 12 so as to again advance the laser machining head 38 in the x-axis positive direction of the movement machine coordinate system C1 from the retraction position $P_R$ toward the interruption position $P_1$.

Here, in the present embodiment, the movement machine 12 receives a command from the processor 102 in step S9, accelerates the laser machining head 38 according to an acceleration time constant $\tau$ to a target speed $V_T$, and advances the laser machining head 38 toward the interruption position $P_1$ at the target speed $V_T$. The acceleration time constant $\tau$ represents the time required for the movement machine 12 to accelerate the stopped laser machining head 38 to the target speed $V_T$. The acceleration time constant $\tau$ and the target speed $V_T$ are determined in advance as operation conditions of the movement machine 12.

Note that the processor 102 may start steps S8 and S9 simultaneously. In this case, the processor 102 may control the laser beam generation operation (i.e., the heating operation) of the laser oscillator 34 such that laser power of the laser beam emitted by the laser oscillator 34 is increased depending on (specifically, in proportion to) an advance speed of the laser machining head 38.

Figure 6:
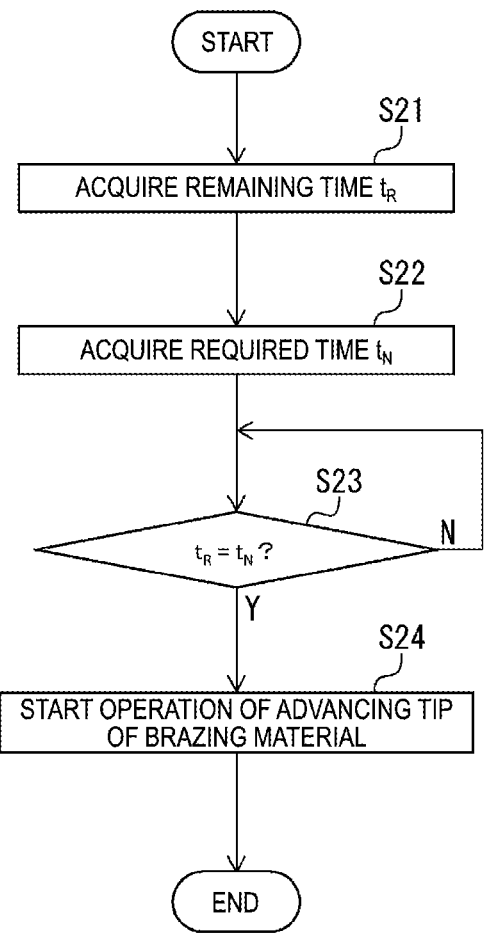
FIG. 6 is a flowchart illustrating an example of the flow of step S10 in FIG. 3.

In step S10, the processor 102 executes a brazing material refeeding process. Step S10 will be described with reference to FIG. 6. In step S21, the processor 102 acquires a remaining time $t_R$ until the heating device 54 (laser machining head 38) reaches the interruption position $P_1$. As an example, after the start of step S9, the processor 102 acquires a position $P_V$ (specifically, coordinates of the movement machine coordinate system C1) of the laser machining head 38 (the origin of the tool coordinate system C2) at the time when the advance speed of the laser machining head 38 reaches the target speed $V_T$.

Subsequently, the processor 102 performs a calculation of a remaining time $t_{R1}$ at this time point by dividing a distance $\delta$ between the interruption position $P_1$ acquired in the above-described step S5 and the position $P_V$ by the target speed $V_T$ (i.e., $t_{R1}=\delta/V_T$). Subsequently, the processor 102 starts counting the remaining time $t_{R1}$ simultaneously with the calculation. In this way, in the present embodiment, the processor 102 functions as a remaining time acquisition section 114 (FIG. 2) that acquires the remaining time $T_R$.

In step S22, the processor 102 acquires a required time $t_N$ that is required for the brazing material moving mechanism 56 (specifically, the brazing material feeding device 16) to cause the tip 46a of the brazing material 46 retracted in the above-described step S4 to reach the heating position HP. For example, the processor 102 can determine the required time $t_N$ by dividing the above-described movement amount $\Delta_0$ by the above-described speed $V_F$ ($t_N=\Delta_0/V_F$). That is, the processor 102 acquires the required time $t_N$ by an arithmetic operation based on the movement amount $\Delta_0$ and the speed $V_F$ in step S22.

Alternatively, the required time $t_N$ may be determined in advance based on the movement amount $\Delta_0$ and the speed $V_F$ and stored in advance in the storage section 104. Subsequently, the processor 102 may read out and acquire the required time $t_N$ from the storage section 104 in step S22. In this way, in the present embodiment, the processor 102 functions as a feeding time acquisition section 116 (FIG. 2) that acquires the required time $t_N$.

In step S23, the processor 102 determines whether the remaining time $t_{R1}$ for which counting has started in the most recent step S21 has reached the required time $t_N$ acquired in the most recent step S22 (i.e., $t_{R1}=t_N$). Specifically, upon starting the counting in the most recent step S21, the remaining time $t_{R1}$ decreases over time.

In this step S23, the processor 102 checks the remaining time $t_{R1}$ being counted against the required time $t_N$ acquired in step S22 and determines whether $t_{R1}=t_N$. The processor 102 determines YES and proceeds to step S24 when $t_{R1}=t_N$, and determines NO and repeats step S23 when $t_{R1}>t_N$. Note that parameters related to the remaining time $t_{R1}$ and the required time $t_N$, such as the retraction distance $d_R$, the target speed $V_T$, the movement amount $\Delta_0$, and the speed $V_F$, are set such that the remaining time $t_{R1}$ before the counting acquired in step S21 is sufficiently larger than the required time $t_N$.

In step S24, the processor 102 functions as the brazing controller 110 and controls the brazing material moving mechanism 56 (brazing material feeding device 16) so as to start the operation to advance the tip 46a of the brazing material 46 toward the heating position HP. Specifically, the processor 102 operates the feeding motor 50 of the brazing material feeding device 16 to feed out the brazing material 46, thereby causing the tip 46a of the brazing material 46 that was retracted to advance along the feeding axis A toward the heating position HP.

Here, in the present embodiment, since the operation to advance the tip 46a of the brazing material 46 is started in step S24 when the remaining time $t_{R1}$ is equal to the required time $t_N$ (when YES is determined in step S23), the tip 46a of the brazing material 46 reaches the heating position HP at the same time as the laser machining head 38 reaches interruption position $P_1$.

In this way, the brazing performed on the base materials W1 and W2 is resumed, and the processor 102 controls the movement machine 12 according to the work program BP so as to advance the laser machining head 38 in the x-axis positive direction of the movement machine coordinate system C1 while controlling the brazing material feeding device 16 so as to feed out the brazing material 46 at the speed $V_F$.

Referring again to FIG. 3, in step S11, the processor 102 determines whether the brazing is complete from the start point SP to the end point EP of the work path WP. For example, the processor 102 can determine whether the brazing is complete by monitoring the position of the laser machining head 38 (the origin of the tool coordinate system C2) in the movement machine coordinate system C1 acquired from the feedback FB described above.

Figure 3:
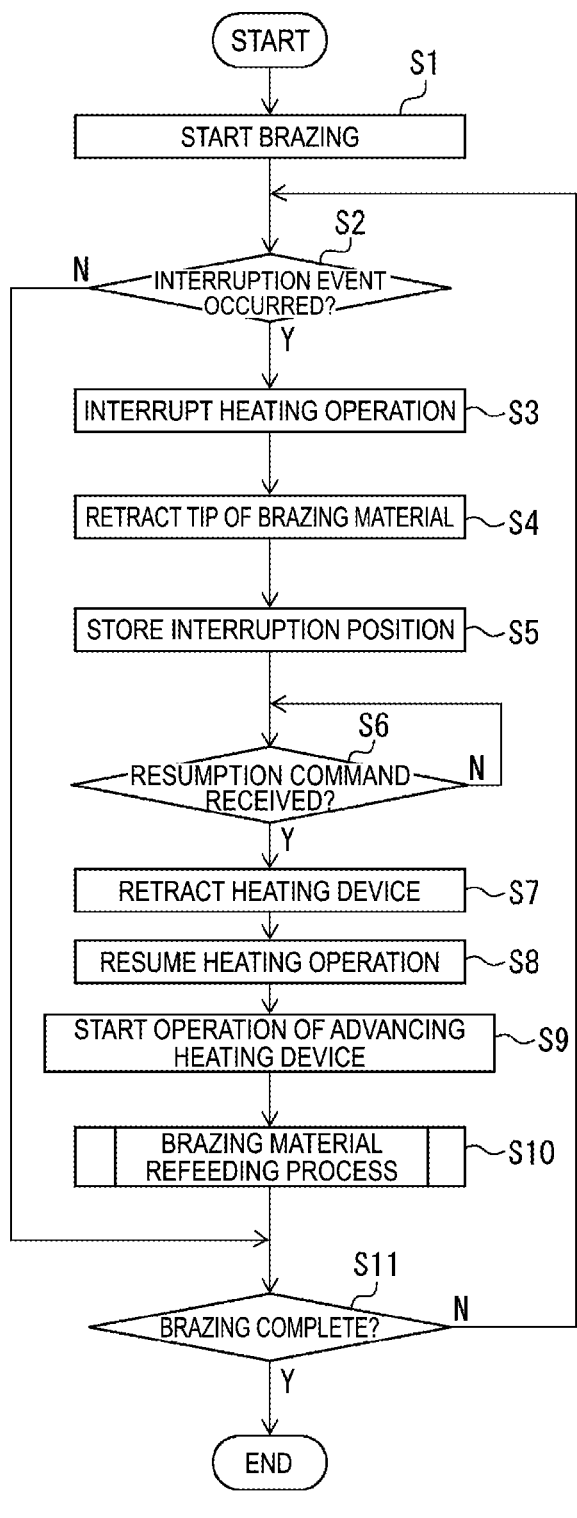
FIG. 3 is a flowchart illustrating an example of an operation flow of the brazing system illustrated in FIG. 1.

Upon determining that the brazing is complete (i.e., YES), the processor 102 stops the operations of the movement machine 12, the laser device 14, and the brazing material feeding device 16, and terminates the flow illustrated in FIG. 3. On the other hand, upon determining NO, the processor 102 returns to step S2. In this way, the processor 102 repeats steps S2 to S11 until determining YES in step S11.

As described above, in the present embodiment, the processor 102 causes the tip 46a of the brazing material 46 to reach the heating position HP at the same time as the laser machining head 38 reaches the interruption position $P_1$, to thereby resume the brazing. An effect of this function will be described below. When the brazing is interrupted in steps S3 and S4, the brazing material 46 (or the bead 46') applied along the work path WP stops being supplied at the heating position HP corresponding to the interruption position $P_1$.

According to the present embodiment, the tip 46a of the brazing material 46 is fed to the heating position HP at a timing when the heating position HP of the laser machining head 38 that started advancing in step S9 has reached an end ED of the brazing material 46 (bead 46') that had stopped being supplied due to the interruption of the brazing, and thereby the brazing can be resumed while the laser machining head 38 is advancing. In the bead 46' formed in this manner, it is possible to prevent a shape defect such as unevenness at the interrupted portion of the brazing, and thus form a bead 46' that smoothly extends along the work path WP.

In addition, in the present embodiment, the processor 102 interrupts the heating operation in step S3. According to this configuration, it is possible to prevent the base materials W1 and W2 from being damaged by the heating operation (laser beam irradiation) of the heating device 54 (laser device 14) during the interruption of brazing. On the other hand, the processor 102 resumes the heating operation when starting step S9. According to this configuration, it is possible to remelt the bead 46' that was brazed before the interruption by the heating operation during steps S9 to S10, and thereby resume the brazing from the end ED of the bead 46' that had stopped being supplied due to the interruption.

In the bead 46' formed in this manner, it is possible to further effectively prevent defects such as unevenness at the interrupted portion of brazing. Further, a process of preheating the base materials W1 and W2 at the resumption of brazing can be omitted. Accordingly, equipment for preheating can be omitted, and a work cycle time can be reduced.

In addition, in the present embodiment, the processor 102 acquires the remaining time $t_R$ in step S21 and determines a timing for starting step S24 based on the remaining time $T_R$. Specifically, the processor 102 determines the timing for starting step S24 such that step 24 is started at a time when the remaining time $t_R$ reaches the required time $t_N$.

According to this configuration, after the start of step S9, it is possible to match a time point when the laser machining head 38 reaches the interruption position $P_1$ (i.e., the heating position HP reaches the end ED of the brazing material 46) with a time point when the tip 46a of the brazing material 46 reaches the heating position HP, with a higher degree of accuracy.

Also, in the present embodiment, the processor 102 stores the position data of the interruption position $P_1$ (step S5), and controls the operation to cause the tip 46a of the brazing material 46 to reach the heating position HP based on the position data (steps S21 to S24). According to this configuration, the brazing material refeeding process in step S10 can be performed more accurately by using the position data.

However, step S5 in FIG. 3 can be also omitted. In this case, the processor 102 executes steps S6 to S11 after step S4. Regarding step S21 to be executed in this case, for example, a remaining time $t_{R2}$ at a time point when the laser machining head 38 starts advancing in step S9 may be determined in advance and stored in the storage section 104 in advance.

The remaining time $t_{R2}$ can be determined by an experimental technique, an arithmetic operation, a simulation, or the like when the retraction distance $d_R$, the acceleration time constant $\tau$, and the target speed $V_T$ described above are already known. Subsequently, the processor 102 may function as the remaining time acquisition section 114 to read out and retrieve the remaining time $t_{R2}$ from the storage section 104 by executing step S21 simultaneously with step S9 (or before step S9), and start counting the remaining time $t_{R2}$ simultaneously with the start of step S9.

Subsequently, in step S23, the processor 102 may determine whether the remaining time $t_{R2}$ for which counting has started has reached the required time $t_N$ (i.e., $t_{R2}=t_N$). According to the present embodiment, step S10 can be executed without storing the position data of the interruption position $P_1$ in step S5.

Further, the brazing material refeeding process in step S10 can be also performed without acquiring the remaining time $t_R$ and the required time $t_N$. In the following, another example of the flow of step S10 will be described with reference to FIG. 7. Note that, in the flow illustrated in FIG. 7, processes similar to those of the flow illustrated in FIG. 6 will be denoted by the same step numbers and redundant descriptions will be omitted.

In step S31, the processor 102 acquires an advance distance $d_A$ of the laser machining head 38 (the origin of the tool coordinate system C2) from the time at which step S9 is started. The advance distance $d_A$ can be determined from the coordinates of the laser machining head 38 (the origin of the tool coordinate system C2) in the movement machine coordinate system C1 acquired from the feedback FB described above. In step S32, the processor 102 determines whether the advance distance $d_A$ acquired in the most recent step S31 has reached a predetermined threshold value $d_{A\_th}$. A method of setting the threshold value $d_A$ to will be described below.

When the advance distance $d_A$ of the laser machining head 38 has reached the threshold value $d_{A\_th}$, a remaining distance $d_B$ from the position of the laser machining head 38 at this time point to the interruption position $P_1$ is $d_B=d_R-d_{A\_th}$. Also, when the laser machining head 38 has been advanced at the target speed $V_T$ at this time point, a time to from this time point until the laser machining head 38 reaches the interruption position $P_1$ can be determined as $t_a=d_B/V_T$.

On the other hand, since the required time $t_N$ described above is defined as $t_N=\Delta_0/V_F$, the threshold value $d_{A\_th}$ can be defined as $d_{A\_th}=d_R-\Delta_0V_T/V_F$ based on an equation of $t_a=t_N$, that is, $d_B/V_T=(d_R-d_{A\_th})/V_T=\Delta_0/V_F$. In other words, the threshold value $d_{A\_th}$ can be uniquely defined when the retraction distance $d_R$, the movement amount (winding amount) $\Delta_0$, the target speed $V_T$, and the speed $V_F$ are already known.

The processor 102 determines YES and proceeds to step S24 when the advance distance $d_A$ has reached the threshold value $d_{A\_th}$ ($d_A=d_{A\_th}$), and determines NO and returns to step S31 when the advance distance $d_A$ has not reached the threshold value $d_{A\_th}$ ($d_A<d_{A\_th}$). According to the example illustrated in FIG. 7, the processor 102 can determine the timing for starting step S24 based on the advance distance $d_A$ (i.e., the position data of the laser machining head 38 or the origin of the tool coordinate system C2) without using the remaining time $t_R$ and the required time $t_N$.

Even when step S24 is started at the timing determined in this manner, the tip 46a of the brazing material 46 can be made to reach the heating position HP at the same time as the laser machining head 38 reaches the interruption position $P_1$. Also, in the present embodiment, it is not necessary to store the position data of the interruption position $P_1$, and thus step S5 can be omitted.

Figure 7:
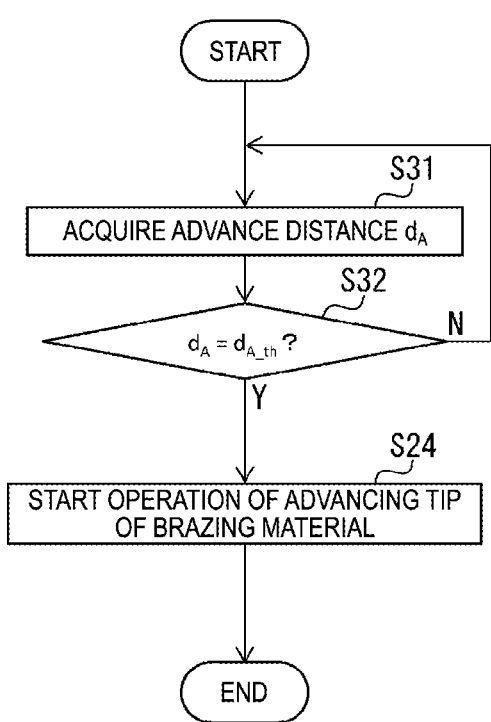
FIG. 7 is a flowchart illustrating another example of the flow of step S10 in FIG. 3.

As a further alternative example of step S10, in step S31 in FIG. 7, the processor 102 may determine a remaining distance dc from the laser machining head 38 (the origin of the tool coordinate system C2) to the interruption position $P_1$ instead of the advance distance $d_A$. The remaining distance $d_C$ can be determined as a distance between the interruption position $P_1$ and the position of the laser machining head 38 at this time point.

Subsequently, in step S32, the processor 102 determines whether the remaining distance $d_C$ has reached a predetermined threshold value $d_{C\_th}$. The threshold value $d_{C\_th}$ can be defined as $d_{C\_th}=\Delta_0V_T/V_F$ based on the following equation: $d_{C\_th}/V_T=\Delta_0/V_F$. The processor 102 determines YES and proceeds to step S24 when the remaining distance $d_C$ has reached the threshold value $d_{C\_th}$ ($d_C=d_{C\_th}$). In this way, the processor 102 can determine the timing for starting step S24 based on the remaining distance dc (i.e., the position data of the laser machining head 38 or the origin of the tool coordinate system C2) without using the remaining time $t_R$ and the required time $t_N$.

Next, another example of an operation of the brazing system 10 will be described with reference to FIG. 8 and FIG. 9. In the present embodiment, when the brazing is interrupted after the start of step S1, the processor 102 changes the retraction distance $d_R$ by which the heating device 54 (laser machining head 38) is retracted in step S7, depending on a work completion distance $d_P$ over which the brazing has been completed by the time point of the interruption.

Another example of an operation flow of the brazing system 10 will be described with reference to FIG. 9. Note that, in the flow illustrated in FIG. 9, processes similar to those of the flow illustrated in FIG. 3 will be denoted by the same step numbers and redundant descriptions will be omitted. After the start of the flow in FIG. 9, the processor 102 executes steps S1 to S5 in the same manner as the embodiment described above.

In step S41, the processor 102 acquires the work completion distance $d_P$. Specifically, the processor 102 acquires the work completion distance $d_P$ over which the brazing has been completed by a time point when YES is determined in step S2 (or by the start or the completion of step S3 or S4).

For example, the processor 102 acquires the position data (coordinates) of the laser machining head 38 (or the origin of the tool coordinate system C2) in the movement machine coordinate system C1 at a time point when step S1 is started and at a time point when YES is determined in step S2 (or at the start or the completion of step S3 or S4) based on the feedback FB. The processor 102 can acquire the work completion distance $d_P$ based on the position data acquired at these two time points. Alternatively, the processor 102 may acquire the work completion distance $d_P$ based on a position command or the like included in the work program. As described above, in the present embodiment, the processor 102 functions as a completion distance acquisition section 118 (FIG. 8) that acquires the work completion distance $d_P$.

In step S42, the processor 102 determines the retraction distance $d_R$ based on the work completion distance $d_P$ acquired in the most recent step S41. As an example, a data table DT in which the work completion distance $d_P$ and the retraction distance $d_R$ are stored in association with each other is stored in advance in the storage section 104.

For example, in the data table DT, the work completion distance $d_P$ and the retraction distance $d_R$ may be stored in association with each other such that, when the work completion distance $d_P$ is $d_P \leq d_{P\_1}$, the retraction distance $d_R$ is $d_R=d_{R\_1}$ ($<d_{P\_1}$), and when the work completion distance $d_P$ is $d_{P\_1}<d_P$, the retraction distance $d_R$ is $d_R=d_{R\_2}$ ($>d_{R\_1}$). In step S42, the processor 102 applies the work completion distance $d_P$ acquired in the most recent step S41 to the data table DT, retrieves a corresponding retraction distance $d_R$, and determines the retrieved retraction distance $d_R$ as the retraction distance $d_R$ by which the heating device 54 is to be retracted in a subsequent step S7.

As another example, the processor 102 may determine the retraction distance $d_R$ as a value smaller than the work completion distance $d_P$ acquired in the most recent step S41 by a predetermined arithmetic operation. For example, the processor 102 may determine the retraction distance $d_R$ as $d_R = \alpha d_P$ by multiplying the acquired work completion distance $d_P$ by a coefficient $\alpha$ (<1). In this way, the retraction distance $d_R$ is set to be always smaller than the work completion distance $d_P$.

As described above, in the present embodiment, the processor 102 functions as a retraction distance determination section 120 (FIG. 9) that determines the retraction distance $d_R$ based on the work completion distance $d_P$. Subsequently, in step S7, the processor 102 causes the laser machining head 38 to retract in the x-axis negative direction of the movement machine coordinate system C1 by the retraction distance $d_R$ determined in the most recent step S42.

An effect of this function will be described below. An interruption event may occur immediately after the start of step S1, and thus YES may be determined in step S2. In this case, the laser machining head 38 and the heating position HP are located in the vicinity of the start point SP of the work path WP. In this situation, when the processor 102 causes the laser machining head 38 to retract by the retraction distance $d_R$ determined in advance in step S7, the heating position HP may exceed the start point SP.

In the present embodiment, since the processor 102 determines the retraction distance $d_R$ depending on the work completion distance $d_P$ (specifically, such that the retraction distance $d_R$ is smaller than the work completion distance $d_P$), it is possible to prevent the heating position HP from exceeding the start point SP when the laser machining head 38 is retracted in step S7.

Note that the processor 102 may adjust the position of the tip 46a of the brazing material 46 retracted in step S4, depending on the retraction distance $d_R$ determined in step S42. For example, when the retraction distance $d_R$ is smaller than an ordinary required value $d_{R\_2}$, the processor 102 may feed out the brazing material 46 by a predetermined movement amount $\beta$. The movement amount $\beta$ may be determined in advance as a value that allows the tip 46a of the brazing material 46 to reach the heating position HP at the same time as the laser machining head 38 reaches the interruption position $P_1$ in step S10, in consideration of the determined retraction distance $d_R$.

Note that, in the flow illustrated in FIG. 9, the processor 102 may execute steps S41 and S42 after step S3, and subsequently execute steps S4 to S11. In this case, in step S4 that is executed after step S42, the processor 102 may determine the movement amount $\Delta_0$ based on the retraction distance $d_R$ determined in step S42.

Figure 10:
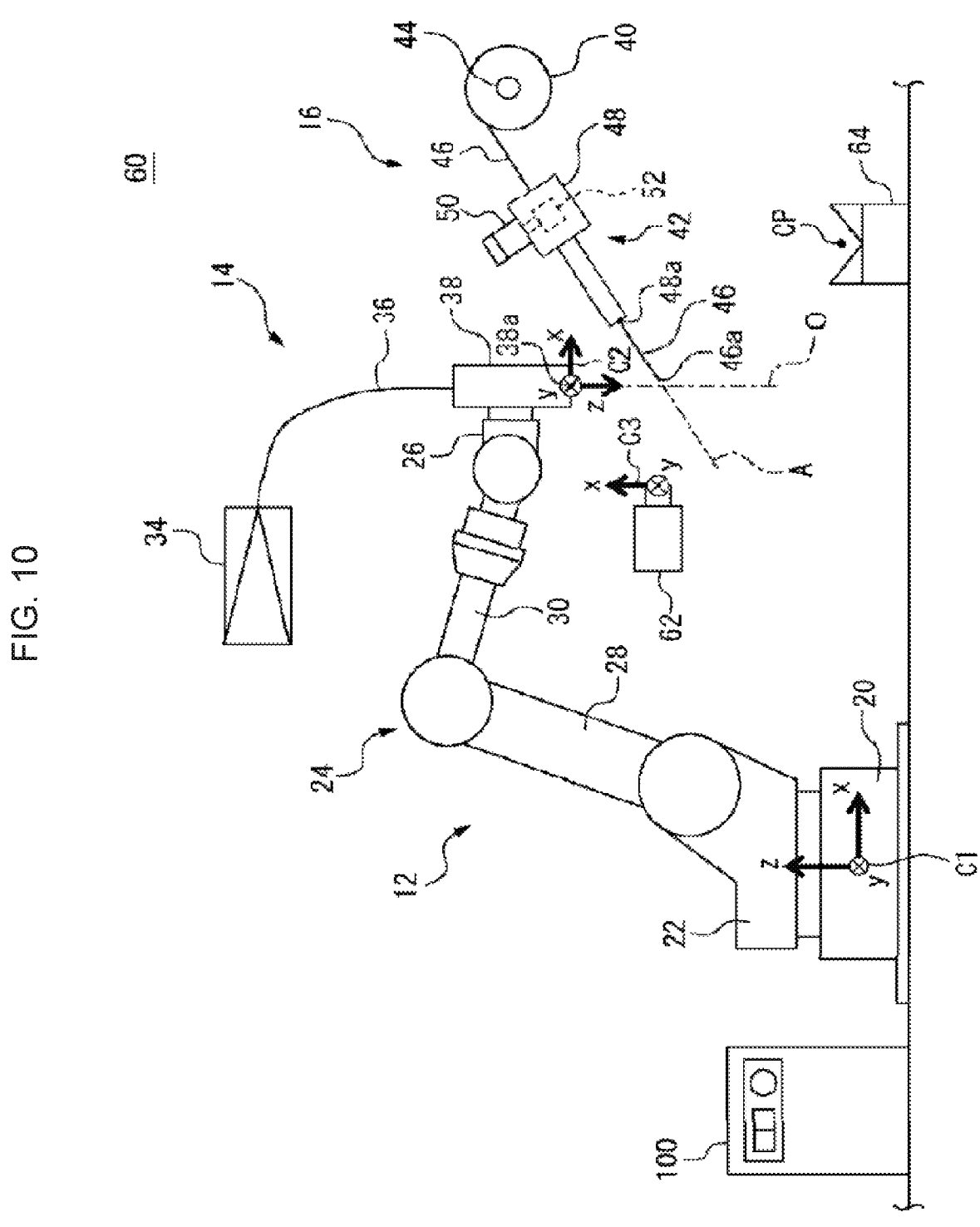
FIG. 10 is a diagram of a brazing system according to another embodiment.
Figure 11:
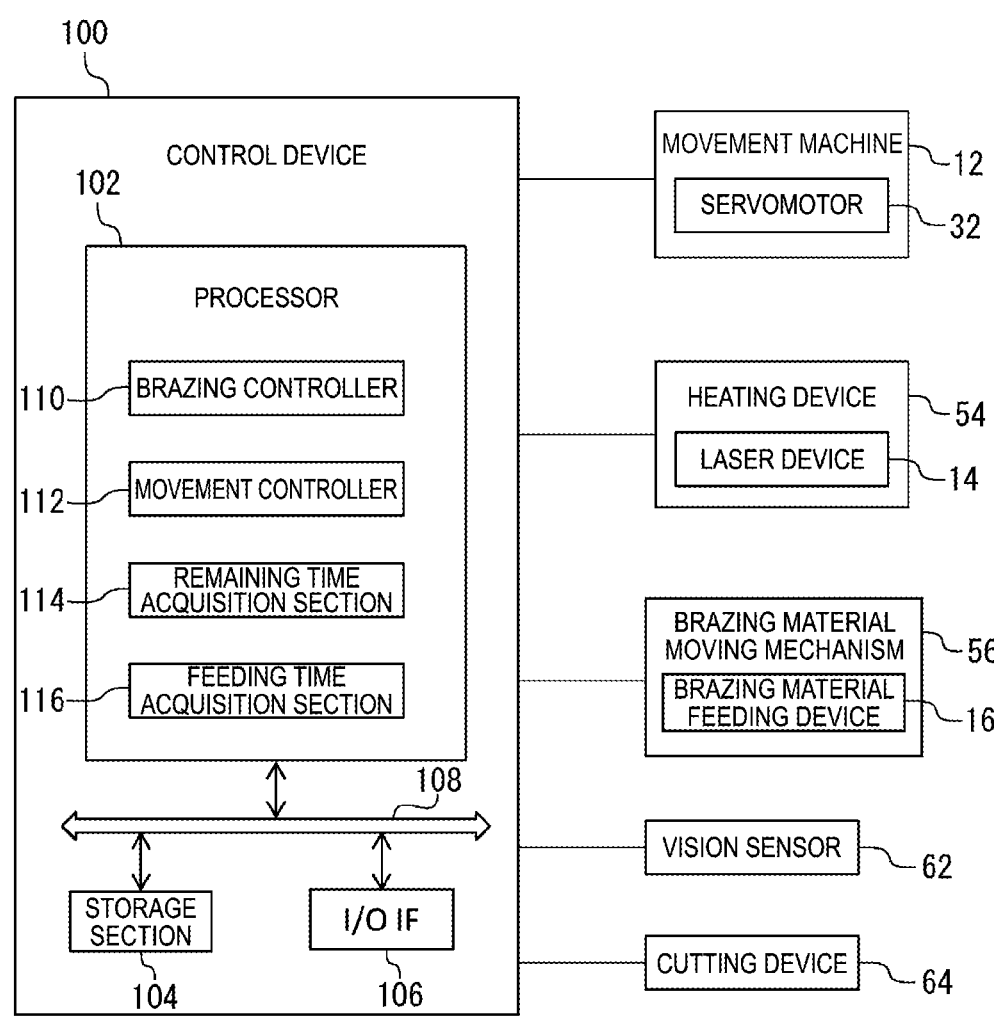
FIG. 11 is a block diagram of the brazing system illustrated in FIG. 10.

Next, a brazing system 60 according to another embodiment will be described with reference to FIG. 10 and FIG. 11. The brazing system 60 includes the movement machine 12, the laser device 14, the brazing material feeding device 16, the control device 100, a vision sensor 62, and a cutting device 64. The vision sensor 62 is, for example, a camera or a three-dimensional vision sensor, and captures an image of an object and generates an image of the captured object.

A sensor coordinate system C3 is set for the vision sensor 62. The sensor coordinate system C3 defines x and y coordinates for each pixel constituting the image captured by the vision sensor 62. The vision sensor 62 is disposed at a known position in the movement machine coordinate system C1, and the sensor coordinate system C3 and the movement machine coordinate system C1 can be coordinate-transformed to each other by calibration.

The cutting device 64 includes a pair of blades, and cuts the brazing material 46 as will be described later. The cutting device 64 is disposed at a known position in the movement machine coordinate system C1, and position data (specifically, coordinates) of a cutting point CP of the cutting device 64 in the movement machine coordinate system C1 is stored in advance in the storage section 104.

Figure 12:
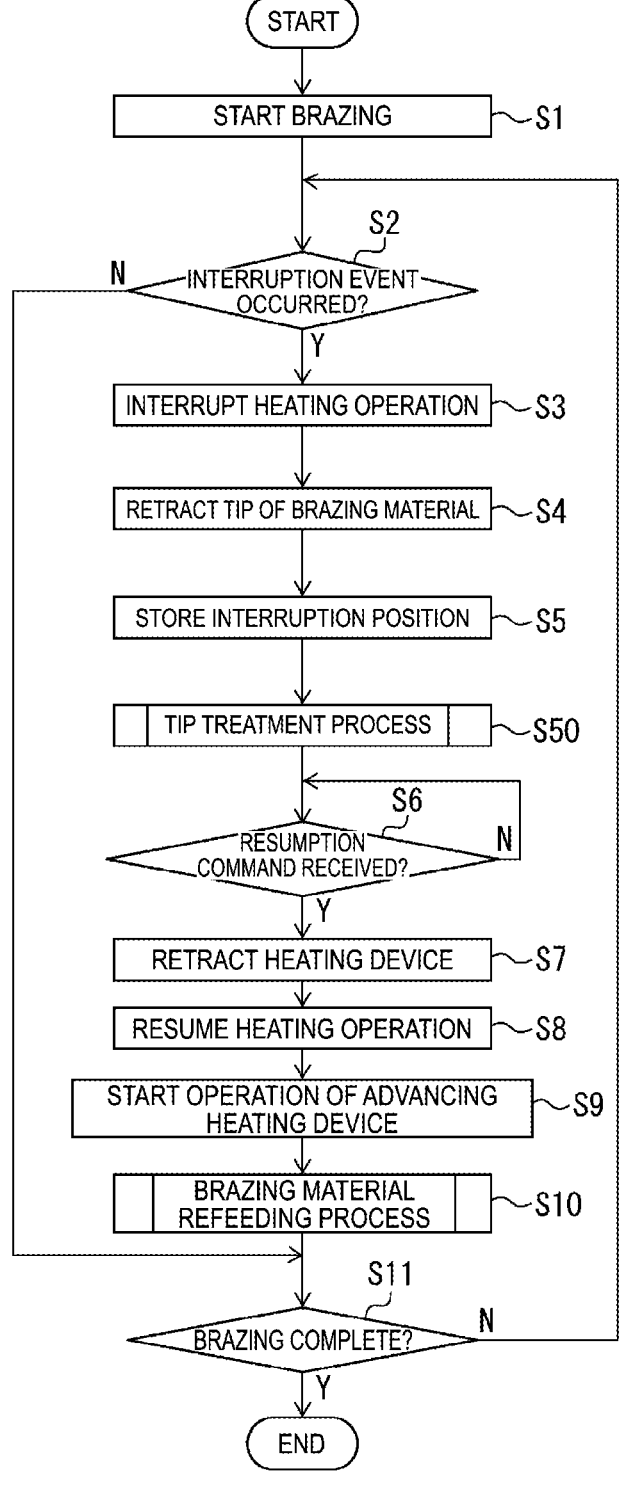
FIG. 12 is a flowchart illustrating an example of an operation flow of the brazing system illustrated in FIG. 10.

Next, an operation of the brazing system 60 will be described with reference to FIG. 12. Note that, in the flow illustrated in FIG. 12, processes similar to those of the flow illustrated in FIG. 3 will be denoted by the same step numbers and redundant descriptions will be omitted. After the start of the flow in FIG. 12, the processor 102 executes steps S1 to S5 in the same manner as the embodiments described above.

Figure 13:
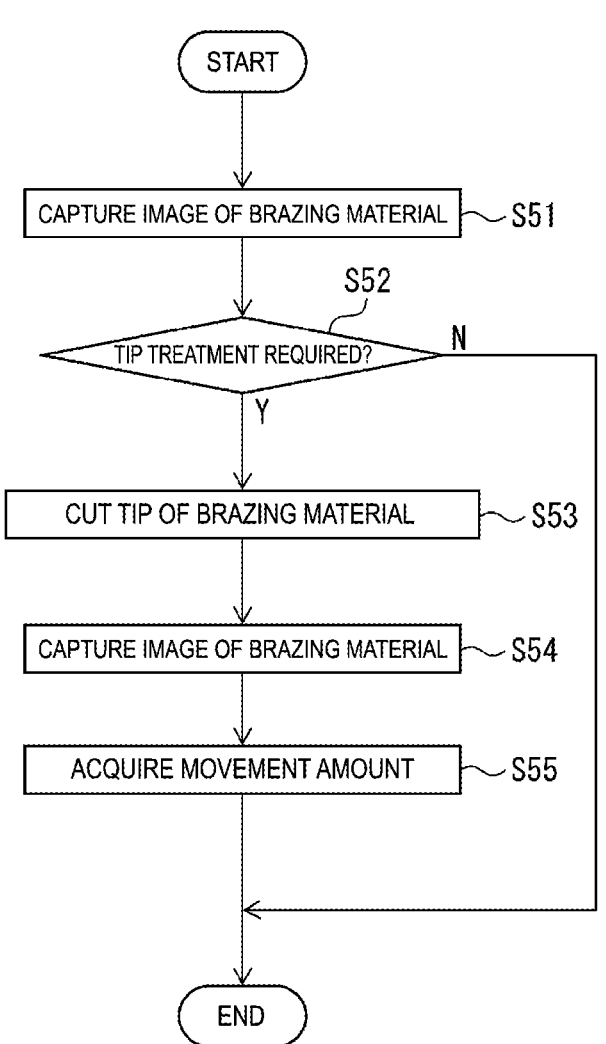
FIG. 13 is a flowchart illustrating an example of the flow of step S50 in FIG. 12.

In step S50, the processor 102 performs a tip treatment process. Step S50 will be described with reference to FIG. 13. In step S51, the processor 102 captures an image of the brazing material 46. Specifically, the processor 102 controls the movement machine 12 based on the position data of the vision sensor 62 in the movement machine coordinate system C1 so as to move the laser machining head 38 and the feeding head 42.

Subsequently, the processor 102 positions the laser machining head 38 and the feeding head 42 at an image capturing position where the brazing material 46 extending from the feeding port 48a of the feeding head 42 enters the field of vision of the vision sensor 62. At this time, the feeding head 42 is positioned such that the feeding axis A of the feeding head 42 is parallel to the x-y plane of the sensor coordinate system C3. Subsequently, the processor 102 operates the vision sensor 62 to capture an image of the brazing material 46 extending from the feeding port 48a.

In step S52, the processor 102 determines whether a process of cutting the tip 46a of the brazing material 46 is necessary. Here, as a result of retracting the tip 46a in step S4, there is a possibility that a defect such as a spherical portion may be formed at the tip 46a. Such a defect in the shape of the tip 46a may cause unevenness or the like in the bead 46' to be formed later when the brazing is resumed.

In this step S52, the processor 102 analyzes the image captured in the most recent step S51 and determines whether there is a defect (spherical portion) in the shape of the tip 46a. For example, the processor 102 can determine whether there is a defect in the shape of the tip 46a by extracting the shape of the tip 46a in the image and comparing the shape with a reference shape stored in advance.

Alternatively, the processor 102 may determine whether there is a defect in the shape of the tip 46a by using a machine learning model obtained by machine learning. The machine learning model can be built by using a machine learning method such as supervised learning that uses the image of the tip 46a and label information indicating the state of the tip 46a ("normal", "failure", etc.) as supervised data.

The processor 102 determines YES and proceeds to step S53 when there is a defect in the shape of the tip 46a. On the other hand, when there is no defect in the shape of the tip 46a, the processor 102 determines NO, repositions the laser machining head 38 at the interruption position $P_1$ stored in step S5, and proceeds to step S6 in FIG. 12.

In step S53, the processor 102 cuts the tip 46a of the brazing material 46. Specifically, the processor 102 controls the movement machine 12 based on the position data of the cutting point CP in the movement machine coordinate system C1 so as to move the laser machining head 38 and the feeding head 42 and position the laser machining head 38 and the feeding head 42 at a cutting position. At this time, a portion in the vicinity of the tip 46a of the brazing material 46 is positioned at the cutting point CP. Subsequently, the processor 102 operates the cutting device 64 to cut the brazing material 46 at the portion in the vicinity of the tip 46a. As a result, the tip 46a of the brazing material 46 is cut off and a new tip 46a' is formed.

In step S54, the processor 102 causes the vision sensor 62 to capture an image of the brazing material 46 in the same manner as in step S51 described above. In step S55, the processor 102 acquires a movement amount $\Delta_1$. Specifically, the processor 102 repositions the laser machining head 38 at the interruption position $P_1$ stored in step S5. At this time, the tip 46a' of the brazing material 46 is arranged at a position retracted from the heating position HP (FIG. 4) by the movement amount $\Delta_1$.

Next, the processor 102 determines the movement amount $\Delta_1$ by using an equation of $\Delta_1 = d_H - L$, where $d_H$ is a distance from the feeding port 48a of the feeding head 42 to the heating position HP in a feeding axis A direction and L is an extension length of the brazing material 46 from the feeding port 48a to the tip 46a' in the feeding axis A direction when the laser machining head 38 is arranged at the interruption position $P_1$.

Here, since the feeding head 42 is arranged to establish a predetermined positional relationship with the laser machining head 38 as described above, the heating position HP and the feeding port 48a of the feeding head 42 can be represented by coordinates in the tool coordinate system C2. Accordingly, the processor 102 can determine the distance $d_H$ from the feeding port 48a to the heating position HP based on the coordinates in the tool coordinate system C2.

Also, the processor 102 analyzes the image captured in the most recent step S54 and acquires an extension length L' of the brazing material 46 from the feeding port 48a to the tip 46a' in the sensor coordinate system C3. Subsequently, the processor 102 transforms the extension length L' in the sensor coordinate system C3 into the movement machine coordinate system C1 to acquire the extension length L in the movement machine coordinate system C1.

In this way, the processor 102 can acquire the distance $d_H$ and the extension length L, and determine the movement amount $\Delta_1$ based on the distance $d_H$, the extension length L and the equation described above. Subsequently, the processor 102 proceeds to step S6 in FIG. 12. Subsequently, the processor 102 executes step S10 (specifically, step S22) by using the movement amount $\Delta_1$ acquired in step S55.

According to the present embodiment, even if a defect occurs at the tip 46a as a result of step S4, the defect can be removed by cutting off a portion of the tip 46a. Further, the movement amount $\Delta_1$ is updated according to the position of the tip 46a' after cutting, and thus, even when a portion of the tip 46a is cut, the tip 46a' of the brazing material 46 can be made to reach the heating position HP at the same time as the laser machining head 38 reaches the interruption position $P_1$ in step S10.

Figure 8:
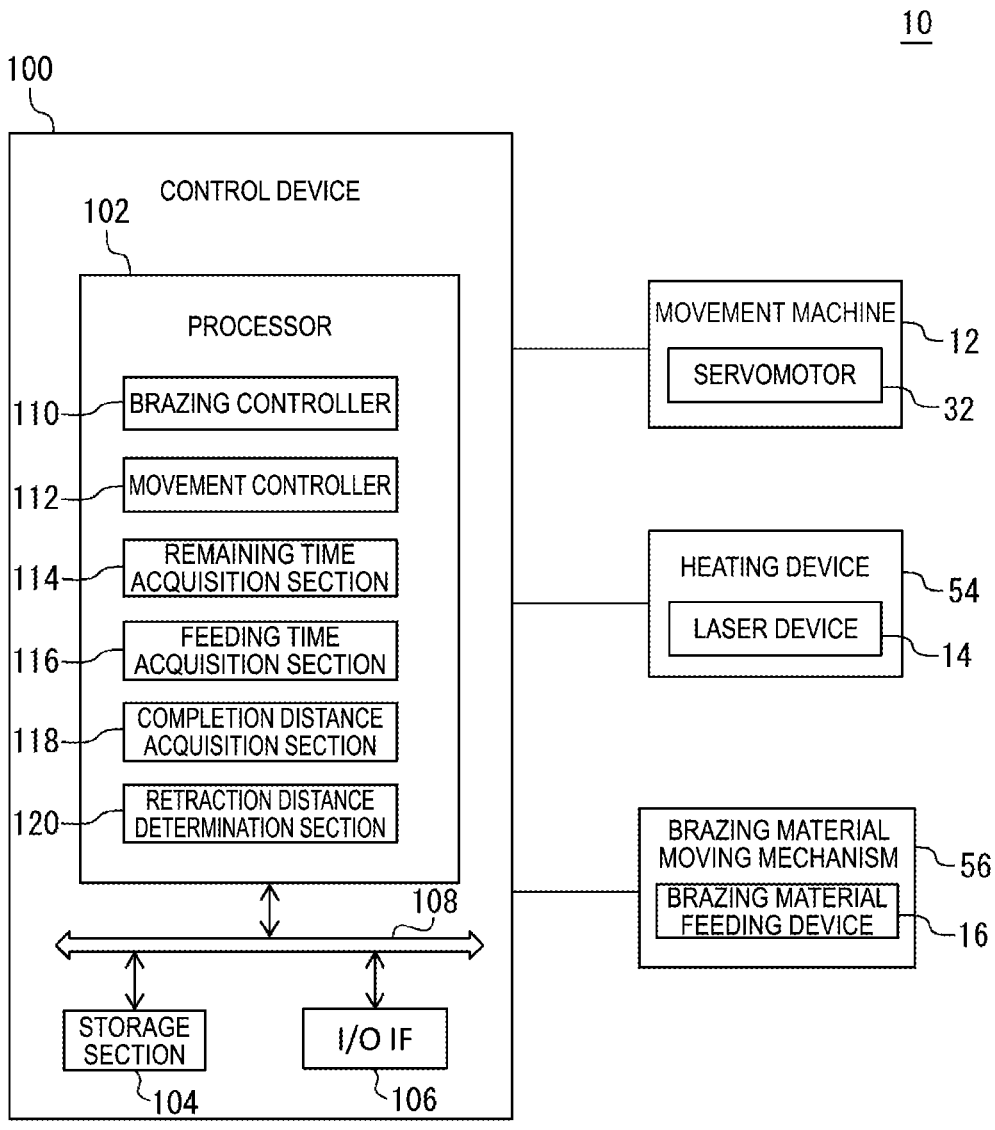
FIG. 8 is a block diagram illustrating other functions of the brazing system.
Figure 9:
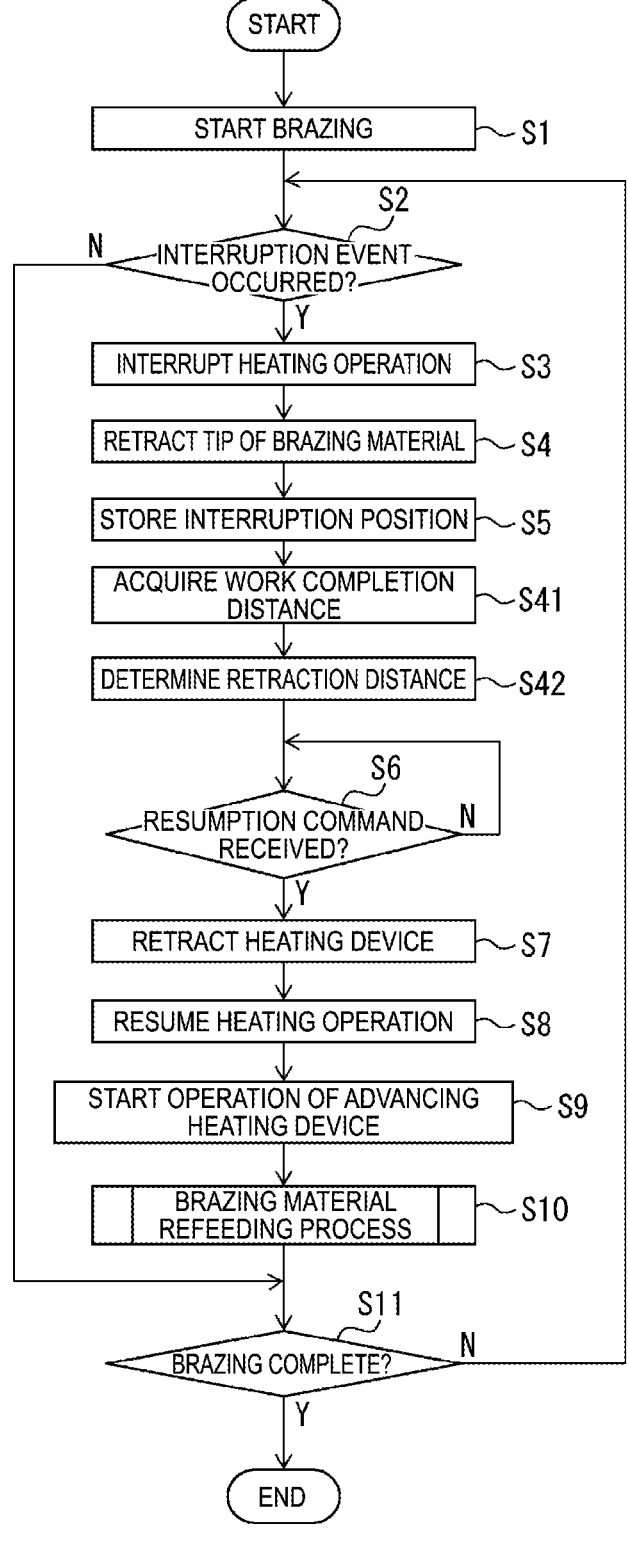
FIG. 9 is a flowchart illustrating another example of an operation flow of the brazing system.

Note that the vision sensor 62 and the cutting device 64 may be applied to the embodiment illustrated in FIG. 8. In this case, the processor 102 may execute step S50 after step S5 or S42 in the flow illustrated in FIG. 9. Subsequently, the processor 102 may execute step S10 in consideration of the movement amount $\Delta_1$ acquired in step S55.

Further, in the brazing system 10 or 60 described above, the processor 102 may set an advance speed $V_{A1}$ at which the laser machining head 38 is advanced by the movement machine 12 after the start of the brazing in step 51 or after the resumption of the brazing and an advance speed $V_{A2}$ at which the laser machining head 38 is advanced in step S9 differently from each other. For example, the processor 102 may set the advance speed $V_{A1}$ to be lower than the advance speed $V_{A2}$.

More specifically, after step S24, the processor 102 determines whether the laser machining head 38 (or the origin of the tool coordinate system C2) has reached the interruption position $P_1$. For example, the processor 102 repeatedly acquires the coordinates of the laser machining head 38 (or the origin of the tool coordinate system C2) in the movement machine coordinate system C1 from the feedback FB described above, and determines whether the coordinates of the laser machining head 38 match the coordinates of the interruption position $P_1$ stored in step S5 described above (or are within a range defined with reference to the coordinates of the interruption position $P_1$).

The processor 102 determines that the laser machining head 38 has reached the interruption position $P_1$ when the coordinates of the laser machining head 38 coincide with the coordinates of the interruption position $P_1$ (or are within a predetermined range). The tip 46a of the brazing material 46 reaches the heating position HP when the laser machining head 38 is determined to have reached the interruption position $P_1$.

Upon determining that the laser machining head 38 has reached the interruption position $P_1$, the processor 50 switches the advance speed at which the laser machining head 38 is advanced by the movement machine 12 from the advance speed $V_{A1}$ in step S9 to the advance speed $V_{A2}$ that is lower than the advance speed $V_{A1}$. In this case, when the laser machining head 38 is advanced again to the interruption position $P_1$ in step S9, the laser machining head 38 is moved at a higher speed. According to this configuration, cycle time of the work can be reduced.

Further, in the brazing system 10 or 60 described above, the processor 102 may set a speed $V_{F1}$ at which the brazing material 46 is fed out by the brazing material moving mechanism 56 (the brazing material feeding device 16) after the start of the brazing in step S1 or after the resumption of the brazing and a speed $V_{F2}$ at which the brazing material 46 is fed out after the start of step S24 differently from each other. For example, the processor 102 may set the speed $V_{F1}$ to be lower than the speed $V_{F2}$.

Specifically, the processor 50 determines whether the laser machining head 38 has reached the interruption position $P_1$ as described above, and upon determining that the interruption position $P_1$ has been reached, switches the speed at which the brazing material 46 is fed out by the brazing material moving mechanism 56 (the brazing material feeding device 16) from the speed $V_{F2}$ in step S24 to the speed $V_{F1}$ that is lower than the speed $V_{F2}$.

In this case, a time required for the tip 46a of the brazing material 46 to reach the heating position HP after the start of step S24 can be reduced, and thus, for example, the retraction distance $d_R$ described above can be set to be shorter. As an example, when the retraction distance $d_R$ is determined to be a smaller retraction distance $d_{R\_1}$ in step S42 described above, the processor 102 may set the speed $V_{F1}$ to be the higher speed $V_{F2}$ depending on the retraction distance $d_{R\_1}$.

Further, in the brazing system 10 or 60 described above, the processor 102 may execute step S7 after step S5, and subsequently execute step S6. In this case, the processor 102 causes the laser machining head 38 to standby at the retraction position $P_R$ until YES is determined in step S6.

In the embodiments described above, cases in which the laser oscillator 34 is a solid laser oscillator have been described. However, the laser oscillator 34 is not limited to this, and may be a gas laser oscillator ($CO_2$ laser oscillator or the like), or may be any type of laser oscillator.

Also, in the embodiments described above, cases in which the processor 102 interrupts the heating operation of the laser device 14 in step S3 have been described. However, this is not a limitation, and, for example, when the base materials W1 and W2 have sufficient heat resistance against the heating operation of the laser device 14, the processor 102 may omit steps S3 and S8 and continue the heating operation while the laser machining head 38 is retracted.

As an example, when the laser oscillator 34 is a gas laser oscillator, the processor 102 may switch an operation mode of the laser oscillator 34 from a main discharge mode to a base discharge mode instead of stopping the laser beam emission operation as the heating operation in step S3. Here, the main discharge mode is an operation mode in which a voltage is applied to a main electrode (not illustrated) of the laser oscillator 34 to generate a main discharge and emit a laser beam having a rated laser power determined as a value required for the execution of brazing.

On the other hand, the base discharge mode is an operation mode in which a voltage is applied to an auxiliary electrode (not illustrated) of the laser oscillator 34 to generate a base discharge and emit a laser beam having a laser power smaller than the rated laser power. The laser oscillator 34 operating in the base discharge mode can promptly switch to the main discharge mode.

Alternatively, when the laser oscillator 34 is a solid laser oscillator, the processor 102 may reduce the laser power of the laser oscillator 34 to a degree that does not damage the base materials W1 and W2, instead of stopping the laser beam emission operation in step S3. In these cases, even when YES is determined in step S2, the laser oscillator 34 does not stop the laser beam emission operation as the heating operation. In this case, the brazing started in step S1 is interrupted in step S4.

In addition, after the laser machining head 38 is retracted in step S4, the processor 102 may execute step S3 after the elapse of a predetermined period of time. The brazing system 10 or 60 described above may also include a plurality of control devices 100A and 100B. In this case, for example, the control device 100A may function as the movement controller 112 so as to control the movement machine 12, and the control device 100B may function as the brazing controller 110 so as to control the heating device 54 and the brazing material moving mechanism 56.

Note that in the embodiments described above, cases in which the brazing material moving mechanism 56 includes the brazing material feeding device 16 that can feed out and wind in the brazing material 46 have been described. However, this is not a limitation, and the brazing material moving mechanism 56 may include a device different from the brazing material feeding device 16. The above-mentioned aspect is illustrated in FIG. 14.

Figure 14:
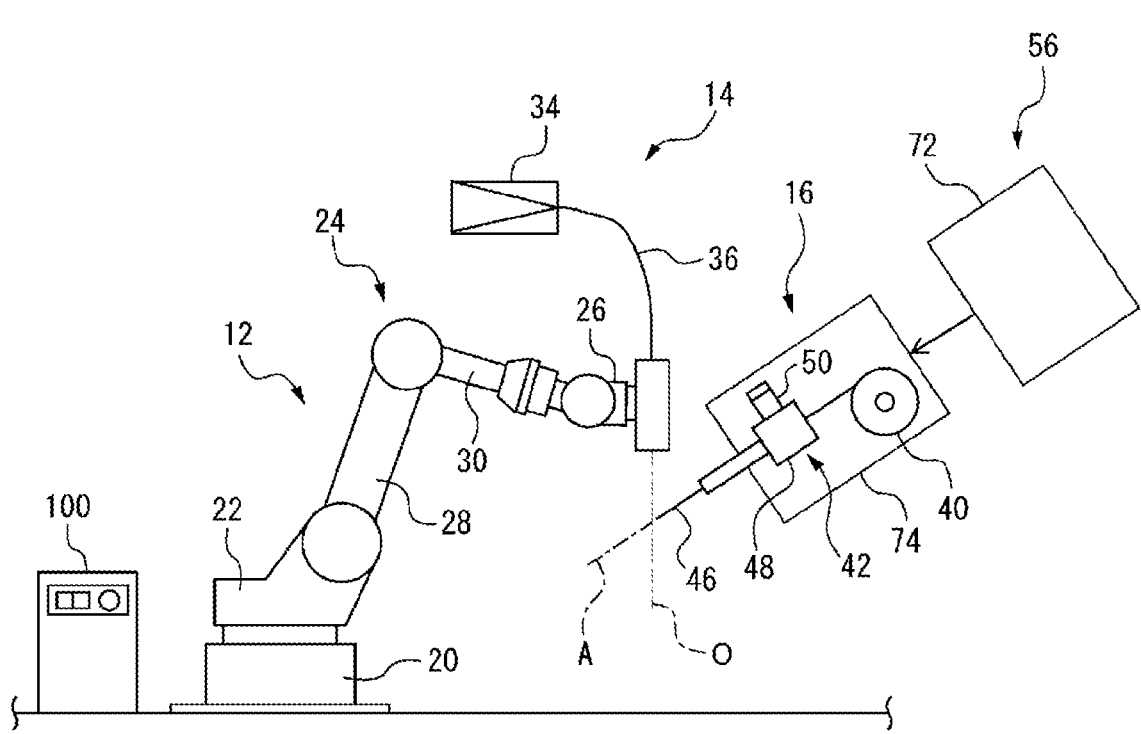
FIG. 14 is a diagram of a brazing system according to still another embodiment.

In a brazing system 70 illustrated in FIG. 14, the brazing material moving mechanism 56 includes a moving device 72 that moves the brazing material feeding device 16. Specifically, the brazing material feeding device 16 further includes a housing 74 that houses the drum 40 and the feeding head 42, and the moving device 72 includes, for example, a vertical articulated type robot or a ball screw mechanism that is mechanically connected to the housing 74, and the whole of the brazing material feeding device 16 is moved by moving the housing 74. Note that the moving device 72 may be configured to move the feeding head 42 only.

The moving device 72 may advance and retract the brazing material feeding device 16 (feeding head 42) along the feeding axis A. In steps S4 and S24 described above, the processor 102 operates the moving device 72 to move the brazing material feeding device 16 (feeding head 42) and move the tip 46a of the brazing material 46 by the movement amount $\Delta_0$ (or $\Delta_1$).

Note that the direction in which the moving device 72 moves the brazing material feeding device 16 (feeding head 42) is not limited to the feeding axis A direction, and may be, for example, a z-axis positive direction, the x-axis positive direction, or a y-axis direction of the movement machine coordinate system C1, or may be any direction as long as the tip 46a can be separated from the heating position HP. Alternatively, the brazing material moving mechanism 56 may include the brazing material feeding device 16 and the moving device 72, and the tip 46a may be moved by the movement amount $\Delta_0$ (or $\Delta_1$) by cooperation between the brazing material feeding device 16 and the moving device 72.

In the embodiments described above, cases in which the heating device 54 includes the laser device 14 have been described. However, this is not a limitation, and the heating device 54 may be any type of heating device such as a burner or a soldering iron. In addition, the heating device 54 may include a plurality of the laser devices 14, or may be a combination of different types of heating devices. Further, although cases where the movement machine 12 is a vertical articulated type robot have been described in the embodiments described above, this is not a limitation, and the movement machine 12 may be any type of robot such as a horizontal articulated type robot or a parallel link type robot.

In the embodiments described above, cases in which the movement machine 12 moves the heating device 54 (laser machining head 38) with respect to the base materials W1 and W2 have been described. However, this is not a limitation, and the movement machine may be configured to move the base materials W1 and W2 with respect to the heating device 54 (laser machining head 38).

In that case, for example, the movement machine may include a workpiece table which is movably provided along the x-y plane of the movement machine coordinate system C1 and on which the base materials W1 and W2 are set, and a moving mechanism (e.g., a servomotor and a ball screw mechanism) that moves the workpiece table in the x-axis and y-axis directions of the movement machine coordinate system C1 in response to a command from the control device 100.

In this case, the processor 102 functions as the movement controller 112 and operates the moving mechanism to move the workpiece table. As a result, the processor 102 performs the brazing while causing the base materials W1 and W2 to move with respect to the laser machining head 38. Subsequently, when the brazing is interrupted, the processor 102 causes the workpiece table and the base materials W1 and W2 to retract in a direction opposite to the movement direction for the execution of brazing in step S7 described above, and subsequently advance again toward the movement direction in step S9.

Subsequently, the processor 102 resumes the brazing by causing the tip 46a of the brazing material 46 to reach the heating position HP at the same time as the workpiece table (i.e., the base materials W1 and W2) reaches the interruption position $P_1$. In this embodiment, the processor 102 may acquire the position data of the workpiece table or the base materials W1 and W2 as the interruption position $P_1$ and the position $P_{1'}$ described above.

Note that the processor 102 may acquire position data of an origin of a control coordinate system (a workpiece table coordinate system or a workpiece coordinate system) set for the workpiece table or the base materials W1 and W2 as the position data of the workpiece table or the base materials W1 and W2. Although the present disclosure is described above through the embodiments, the above-described embodiments do not limit the invention according to the claims.

REFERENCE SIGNS LIST 10, 60, 70 Brazing system
12 Movement machine
14 Laser device
16 Brazing material feeding device
54 Heating device
56 Brazing material moving mechanism
100 Control device
102 Processor
110 Brazing controller
112 Movement controller
114 Remaining time acquisition section
116 Feeding time acquisition section
118 Completion distance acquisition section
120 Retraction distance determination section
The invention claimed is:

1. A control device configured to perform brazing on a base material by controlling a heating device for a brazing material, a movement machine configured to move the heating device and the base material relative to each other, and a brazing material moving mechanism configured to advance and retract a tip of the brazing material with respect to a heating position of the heating device, the control device comprising:

a brazing controller configured to control the brazing material moving mechanism so as to retract the tip of the brazing material from the heating position to interrupt the brazing, during execution of the brazing; and a movement controller configured to, when the brazing is interrupted, control the movement machine so as to retract the heating device or the base material in a direction along a surface of the base material and opposite to a movement direction during the execution of the brazing, and subsequently advance the heating device or the base material in the movement direction again, wherein the brazing controller resumes the brazing by controlling the brazing material moving mechanism so as to cause the tip of the brazing material to reach the heating position at the same time when the heating device or the base material advanced by the movement controller reaches an interruption position at which the brazing is interrupted.

2. A brazing system comprising:

a heating device configured to heat and melt a brazing material;

a movement machine configured to move the heating device and a base material relative to each other;

a brazing material moving mechanism configured to advance and retract a tip of the brazing material with respect to a heating position of the heating device; and the control device of claim 1.

3. The brazing system according to claim 2, wherein the brazing material moving mechanism includes a brazing material feeding device configured to feed out and wind in the brazing material, and the brazing material feeding device advances the tip of the brazing material toward the heating position by feeding out the brazing material and retracts the tip of the brazing material from the heating position by winding in the brazing material.

4. The brazing system according to claim 2, wherein the heating device includes a laser device configured to emit a laser beam along an optical axis, wherein the laser device heats the brazing material at the heating position located on the optical axis by the emitted laser beam.

5. A control device configured to perform brazing on a base material by controlling a heating device for a brazing material, a movement machine configured to move the heating device and the base material relative to each other, and a brazing material moving mechanism configured to advance and retract a tip of the brazing material with respect to a heating position of the heating device, the control device comprising:

a brazing controller configured to control the brazing material moving mechanism so as to retract the tip of the brazing material from the heating position to interrupt the brazing, during execution of the brazing; and a movement controller configured to, when the brazing is interrupted, control the movement machine so as to retract the heating device or the base material in a direction opposite to a movement direction during the execution of the brazing, and subsequently advance the heating device or the base material in the movement direction again, wherein the brazing controller resumes the brazing by controlling the brazing material moving mechanism so as to cause the tip of the brazing material to reach the heating position at the same time when the heating device or the base material advanced by the movement controller reaches an interruption position at which the brazing is interrupted, and wherein the brazing controller is configured to:

interrupt the brazing by controlling the heating device so as to interrupt a heating operation of the heating device and cause the tip of the brazing material to retract from the heating position; and resume the heating operation when the movement controller causes the heating device or the base material to advance again.

6. A control device configured to perform brazing on a base material by controlling a heating device for a brazing material, a movement machine configured to move the heating device and the base material relative to each other, and a brazing material moving mechanism configured to advance and retract a tip of the brazing material with respect to a heating position of the heating device, the control device comprising:

a brazing controller configured to control the brazing material moving mechanism so as to retract the tip of the brazing material from the heating position to interrupt the brazing, during execution of the brazing;

a movement controller configured to, when the brazing is interrupted, control the movement machine so as to retract the heating device or the base material in a direction opposite to a movement direction during the execution of the brazing, and subsequently advance the heating device or the base material in the movement direction again, wherein the brazing controller resumes the brazing by controlling the brazing material moving mechanism so as to cause the tip of the brazing material to reach the heating position at the same time when the heating device or the base material advanced by the movement controller reaches an interruption position at which the brazing is interrupted; and a remaining time acquisition section configured to acquire a remaining time until the heating device or the base material reaches the interruption position, when the movement controller causes the heating device or the base material to advance again, wherein the brazing controller determines a timing to start an advance operation to advance the tip of the brazing material toward the heating position by the brazing material moving mechanism, based on the remaining time.

7. The control device according to claim 6, further comprising:

a feeding time acquisition section configured to acquire a required time for the brazing material moving mechanism to cause the retracted tip of the brazing material to reach the heating position, wherein the brazing controller determines the timing so as to start the advance operation when the remaining time reaches the required time.

8. The control device according to claim 7, wherein the feeding time acquisition section determines the required time based on a movement amount by which the brazing material moving mechanism retracts the tip of the brazing material from the heating position, and on a speed at which the brazing material moving mechanism advances the tip of the brazing material to the heating position.

9. A control device configured to perform brazing on a base material by controlling a heating device for a brazing material, a movement machine configured to move the heating device and the base material relative to each other, and a brazing material moving mechanism configured to advance and retract a tip of the brazing material with respect to a heating position of the heating device, the control device comprising:

a brazing controller configured to control the brazing material moving mechanism so as to retract the tip of the brazing material from the heating position to interrupt the brazing, during execution of the brazing;

a movement controller configured to, when the brazing is interrupted, control the movement machine so as to retract the heating device or the base material in a direction opposite to a movement direction during the execution of the brazing, and subsequently advance the heating device or the base material in the movement direction again, wherein the brazing controller resumes the brazing by controlling the brazing material moving mechanism so as to cause the tip of the brazing material to reach the heating position at the same time when the heating device or the base material advanced by the movement controller reaches an interruption position at which the brazing is interrupted;

a completion distance acquisition section configured to acquire a work completion distance over which the brazing is completed by a time point when the brazing is interrupted; and a retraction distance determination section configured to determine a retraction distance by which the movement controller is to retract the heating device or the base material, based on the work completion distance.

10. A control device configured to perform brazing on a base material by controlling a heating device for a brazing material, a movement machine configured to move the heating device and the base material relative to each other, and a brazing material moving mechanism configured to advance and retract a tip of the brazing material with respect to a heating position of the heating device, the control device comprising:

a brazing controller configured to control the brazing material moving mechanism so as to retract the tip of the brazing material from the heating position to interrupt the brazing, during execution of the brazing;

a movement controller configured to, when the brazing is interrupted, control the movement machine so as to retract the heating device or the base material in a direction opposite to a movement direction during the execution of the brazing, and subsequently advance the heating device or the base material in the movement direction again, wherein the brazing controller resumes the brazing by controlling the brazing material moving mechanism so as to cause the tip of the brazing material to reach the heating position at the same time when the heating device or the base material advanced by the movement controller reaches an interruption position at which the brazing is interrupted; and a storage configured to store position data of the interruption position in a control coordinate system for controlling the movement machine, wherein the brazing controller controls an operation to cause the tip of the brazing material to reach the heating position, based on the position data.

11. A method of performing brazing on a base material by controlling a heating device for a brazing material, a movement machine configured to move the heating device and the base material relative to each other, and a brazing material moving mechanism configured to advance and retract a tip of the brazing material with respect to a heating position of the heating device, the method comprising:

controlling the brazing material moving mechanism so as to retract the tip of the brazing material from the heating position to interrupt the brazing, during execution of the brazing;

when the brazing is interrupted, controlling the movement machine so as to retract the heating device or the base material in a direction along a surface of the base material and opposite to a movement direction during the execution of the brazing, and subsequently advance the heating device or the base material in the movement direction again; and resuming the brazing by controlling the brazing material moving mechanism so as to cause the tip of the brazing material to reach the heating position at the same time when the advancing heating device or the base material reaches an interruption position at which the brazing is interrupted.

* * * * *